(12) United States Patent
Miyazawa

(10) Patent No.: US 12,342,074 B2
(45) Date of Patent: Jun. 24, 2025

(54) IMAGE PROCESSING DEVICE, IMAGING DEVICE, METHOD OF CONTROLLING IMAGE PROCESSING DEVICE, AND STORAGE MEDIUM

(71) Applicant: CANON KABUSHIKI KAISHA, Tokyo (JP)

(72) Inventor: Hitoshi Miyazawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 17/985,204

(22) Filed: Nov. 11, 2022

(65) Prior Publication Data

US 2023/0179860 A1    Jun. 8, 2023

(30) Foreign Application Priority Data

Dec. 3, 2021   (JP) ................. 2021-197176

(51) Int. Cl.
*H04N 23/68*     (2023.01)
*G06T 7/13*      (2017.01)
*G06V 10/25*     (2022.01)
*G06V 10/74*     (2022.01)

(52) U.S. Cl.
CPC .......... *H04N 23/6811* (2023.01); *G06T 7/13* (2017.01); *G06V 10/25* (2022.01); *G06V 10/761* (2022.01); *G06T 2207/10028* (2013.01); *G06V 2201/07* (2022.01)

(58) Field of Classification Search
CPC ............ H04N 23/6811; H04N 23/633; H04N 23/634; H04N 23/635; H04N 23/6812; H04N 23/683; H04N 23/672; G06T 7/13; G06T 2207/10028; G06T 7/20; G06V 10/25; G06V 10/761; G06V 2201/07; G06V 10/993
See application file for complete search history.

(56) References Cited

U.S. PATENT DOCUMENTS

| | | | | |
|---|---|---|---|---|
| 10,497,107 B1 * | 12/2019 | Lerant | ................. | G06T 5/70 |
| 2019/0205614 A1 * | 7/2019 | Kim | ................. | G06T 5/73 |
| 2020/0213511 A1 * | 7/2020 | Suzuki | ................. | H04N 23/634 |
| 2021/0258488 A1 * | 8/2021 | Nakata | ................. | H04N 23/6812 |

FOREIGN PATENT DOCUMENTS

JP    2020-109948 A    7/2020

* cited by examiner

*Primary Examiner* — Christopher K Peterson
(74) *Attorney, Agent, or Firm* — Cowan, Liebowitz & Latman, P.C.

(57) ABSTRACT

An image processing device including a subject detection unit configured to detect a subject in an image, a subject distance detection unit configured to detect distance information indicating a distance to the subject, a subject shake detection unit configured to detect a subject shake, a notification plane generation unit configured to generate a shake notification image for giving a notification of a subject shake of a specific subject based on the detected subject shake and the distance information, and an image superimposition unit.

19 Claims, 10 Drawing Sheets

IMAGE PROCESSING DEVICE, IMAGING DEVICE, METHOD OF CONTROLLING IMAGE PROCESSING DEVICE, AND STORAGE MEDIUM

BACKGROUND OF THE INVENTION

Field of the Invention

The present invention relates to technology for giving a notification of a subject shake occurring in a captured image.

Description of the Related Art

The following two points are important in order to capture an image by a camera without causing subject shake. The first point is follow a subject by synchronizing the camera with its motion. In this case, when a relative deviation occurs between the subject and the camera, the deviation appears in the image as a subject shake. The second point is to set an appropriate shutter speed. Similarly to camera shake, the lower a shutter speed with respect to the subject shake, the higher the likelihood that the influence of the subject shake on a captured image will be noticeable (the subject shake can be visually recognized by the human eye). Japanese Patent Application Laid-Open No. 2020-109948 discloses technology for making a subject shake visible to a photographer by giving a notification of the subject shake on an electronic viewfinder or on a rear liquid crystal screen of an imaging device.

However, in Japanese Patent Application Laid-Open No. 2020-109948, a shake of a subject is detected using motion vector detection means for detecting a motion between frames of images as a vector value as means for detecting a subject shake. Depending on a subject size appearing in the imaging element and a detection frame size of a motion vector, a subject and other subjects exist in a vector frame, and in a case where a vector other than the subject is detected, the edge of the subject cannot be extracted accurately. For this reason, edges of regions different from the subject may also overlap, which results in a concern that the quality may be degraded.

SUMMARY OF THE INVENTION

The present invention provides an image processing device that generates an image in which a subject shake can be easily confirmed by a photographer.

An image processing device of the present invention one or more processors configured to execute instructions which, when executed by the one or more processors, cause the image processing unit to: detect a subject of an image; detect distance information that indicates a distance to the subject; detect a subject shake; and generate a shake notification image for giving a notification of a subject shake of a specific subject based on the detected subject shake and the distance information.

Further features of the present invention will become apparent from the following description of exemplary embodiments with reference to the attached drawings.

DESCRIPTION OF THE EMBODIMENTS

First Embodiment

Figure 1:
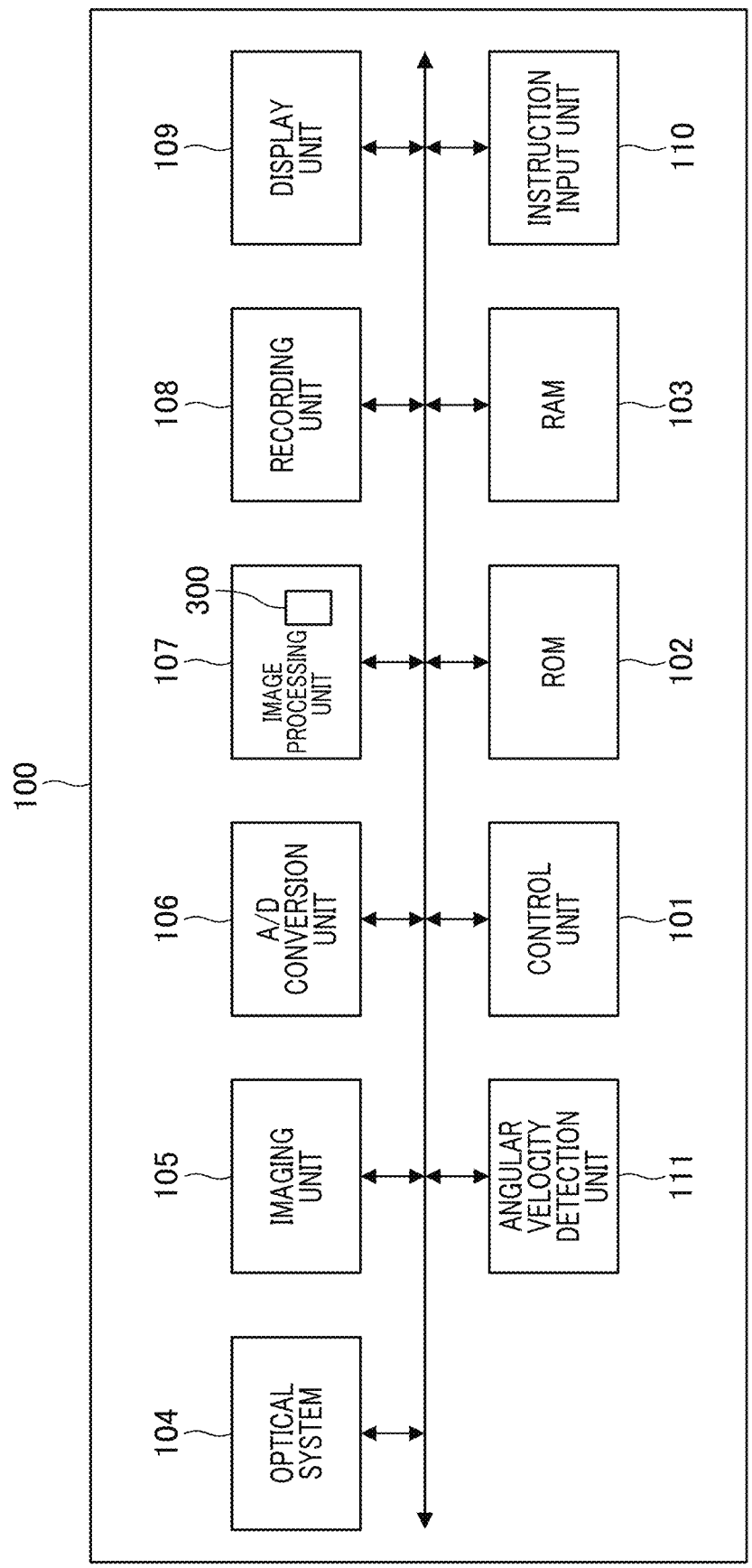
FIG. 1 is a block diagram illustrating an imaging device.

FIG. 1 is a block diagram illustrating an imaging device in the present embodiment. An imaging device 100 is, for example, a digital camera. Note that, although an example of an imaging device including a lens device including an optical system 104 is described as the imaging device 100 in the present embodiment, the present invention is not limited thereto, and the imaging device 100 may be an imaging device in which a lens device is detachable from a main body portion including an imaging unit 105. In addition, the imaging device can be applied to any electronic apparatus that can process a captured image. These electronic apparatuses may include information terminals such as a mobile phone and a tablet terminal.

The imaging device 100 includes a control unit 101, a ROM 102, a RAM 103, the optical system 104, the imaging unit 105, an A/D conversion unit 106, an image processing unit 107, a recording unit 108, an angular velocity detection unit 111, a display unit 109 and an instruction input unit 110. The control unit 101, which is, for example, a central processing unit (CPU), controls the entire imaging device 100 by controlling operations of blocks provided in the imaging device 100.

The ROM 102 is an electrically erasable and recordable non-volatile memory, and in addition to operation programs of the blocks, parameters and the like required for the operation of the blocks included in the imaging device 100 are recorded in the ROM 102. The RAM 103 is a rewritable volatile memory and is used to load programs executed by the control unit 101 and the like and temporarily record data generated by the operation of each block provided in the imaging device 100. The control unit 101 realizes the control of the imaging device 100 by reading a control program for each block provided in the imaging device 100 from the ROM 102, loading the control program into the RAM 103, and executing it.

The optical system 104 forms a subject image on an imaging surface of the imaging unit 105. The optical system 104 includes a lens group including a zoom lens, a focus lens, a camera shake correction lens, and the like. The imaging unit 105 performs photoelectric conversion of an optical image formed on the imaging surface of the imaging unit 105 through the optical system 104 to acquire an image (image signal). Specifically, the imaging unit 105, which is an imaging element such as a CCD or CMOS sensor, performs photoelectric conversion of the optical image formed on the imaging surface of the imaging unit 105 by the optical system 104 and outputs an obtained analog image signal to the A/D conversion unit 106. In the present embodiment, an example in which the imaging unit 105 includes an imaging element that outputs a signal capable of distance measurement of an imaging surface phase difference system will be described. The A/D conversion unit 106 converts an analog image signal input from the imaging unit 105 into digital image data. The digital image data output from the A/D conversion unit 106 is temporarily recorded in the RAM 103.

The image processing unit 107 performs each image processing on image data recorded in the RAM 103. Specifically, the image processing unit 107 applies various image processing for developing, displaying, and recording digital image data such as defect correction processing of pixels caused by the optical system 104 and the imaging element, demosaicing processing, white balance correction processing, color interpolation processing, and gamma processing. In addition, the image processing unit 107 includes a shake notification image generation unit 300. The shake notification image generation unit 300 generates a shake notification image for notifying a photographer of a shake of a subject in an image. The shake notification image is an image for notifying a photographer of a motion shake occurring in the subject. In addition, the shake notification image may be an image for giving a notification that a motion shake is not occurring in the subject, in addition to motion shake occurring in the subject. The shake notification image generation unit 300 generates a shake notification image by generating and superimposing an image plane in which a subject shake can be easily confirmed based on subject shake information and distance information for image data output from the A/D conversion unit 106 and image data recorded in the RAM 103. In addition, the shake notification image generation unit 300 calculates a subject shake and detects the edge of the subject in order to generate an image plane corresponding to the subject shake. Note that a target for image processing to be performed by the image processing unit 107 is not limited to image data recorded in the RAM 103, and for example, image processing may be performed on digital image data output from the A/D conversion unit 106 and image data recorded in the recording unit 108.

The recording unit 108 records data including image data on a recording medium such as a detachable memory card, and outputs the image data to an external device via an external interface. The recording unit 108 records image data processed by the image processing unit 107 as a recording image via the RAM 103.

The display unit 109 includes a display device such as a liquid crystal display (LCD), and displays an image recorded in the RAM 103 and an image recorded in the recording unit 108 on the display device. In addition, the display unit 109 also displays an operation user interface (operation UI) for receiving instructions from a user. Further, the display unit 109 may include a plurality of display devices such as an electronic viewfinder (EVF) and a rear monitor provided on a photographer side (back face). The display unit 109 may be configured to be able to simultaneously perform output to the plurality of display devices, or may be configured to selectively perform display by switching. The instruction input unit 110, which is an input interface including various physical operation members such as a touch panel and a shutter button, receives an input of a user's instruction. The rear monitor provided on the photographer side (back face) may be constituted by a touch panel having functions of both the display unit 109 and the instruction input unit 110. By associating input coordinates and display coordinates in the touch panel, it is possible to configure an operation UI for a photographer to be able to directly operate a screen displayed on the touch panel.

In addition, the imaging device 100 performs live-view imaging for sequentially displaying analog image signals sequentially output from the imaging unit 105 on the display device through the A/D conversion unit 106, the RAM 103, the image processing unit 107, and the display unit 109 under the control of the control unit 101. During live-view imaging, it is possible to make preparations for imaging such as the adjustment of the composition for main imaging, assuming recording on a recording medium and output to an external device, and the change of imaging parameters such as an exposure time (Tv value), an aperture value (Av value), and an ISO sensitivity at the time of the main imaging.

The angular velocity detection unit 111 detects vibration applied to the imaging device 100. The angular velocity detection unit 111, which is, for example, an angular velocity sensor, detects angular velocities in a pitch direction, a yaw direction, and a roll direction which are applied to the imaging device 100 due to a camera shake or camera work. Note that the angular velocity detection unit 111 may be realized as an image processing device that performs processing until the angular velocity detection unit acquires an output signal from the imaging unit 105 in the imaging device 100, displays an image on the display unit 109, and records the image on the recording unit 108. The image processing device generates an image for giving a notification of a subject shake, which will be described later, in the image processing unit 107.

Figure 2:
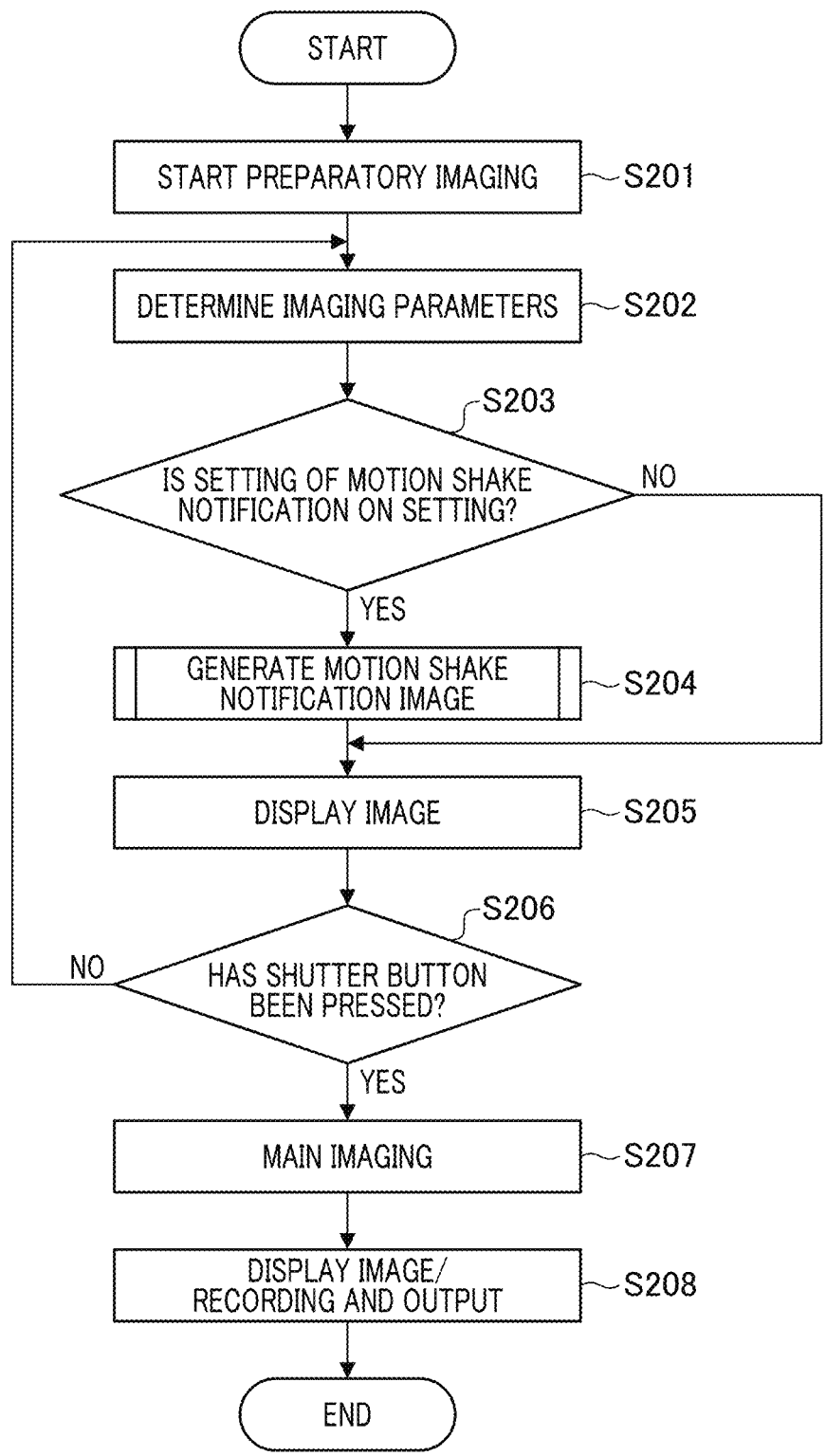
FIG. 2 is a flowchart illustrating imaging processing.

Next, imaging processing performed by the imaging device 100 in the present embodiment will be described in detail with reference to a flowchart of FIG. 2. FIG. 2 is a flowchart illustrating imaging processing. Processing of each step in the present flowchart is realized by causing the control unit 101 to give an instruction to each unit of the imaging device 100 in accordance with a predetermined program read out from the ROM 102 and executed. Note that, in the present embodiment, a case where a photographer performs live-view imaging for performing imaging while checking a real-time image displayed on the rear monitor provided on the photographer side (back face) is described as an example.

The imaging processing is started when the photographer turns on the imaging device 100. In step S201, the control unit 101 starts preparatory imaging in response to the turn-on of the imaging device 100. Specifically, the control unit 101 controls the optical system 104 and the imaging unit 105 to start live-view imaging. During the live-view period, images sequentially captured by the imaging unit 105 (preparatory captured images) are acquired, and the acquired images are displayed on the display device of the display unit 109. The photographer can make imaging preparations such as the adjustment of the composition while confirming live-view images sequentially displayed on the display device. Note that the processes of steps S202 to S206 are performed during a live-view imaging period.

In step S202, the control unit 101 determines imaging parameters for main imaging. The imaging parameters may be parameters such as a shutter speed, an aperture value, and an ISO sensitivity. The imaging parameters may be determined based on a user's instruction input through the instruction input unit 110, or the control unit 101 of the imaging device 100 may automatically set the imaging parameters.

In step S203, the control unit 101 determines whether the setting of a motion shake notification is an ON setting or an OFF setting. The motion shake notification may be set by the user using, for example, the instruction input unit 110, or the imaging device 100 may automatically perform an ON setting or an OFF setting based on predetermined imaging conditions. In a case where the user performs the setting of a motion shake notification, it is possible to perform the setting of the motion shake notification using one physical operation member (a button, a bar, or the like) or one icon on a touch panel and to perform an ON or OFF setting at any timing during preparatory imaging. In addition, it may be possible to perform setting for periodically switching ON/OFF of display of a shake notification. In a case where the control unit 101 determines that the setting of a motion shake notification is an ON setting, the processing proceeds to step S204. On the other hand, in a case where the control unit 101 determines that the setting of a motion shake notification is an OFF setting, the processing proceeds to step S205.

In step S204, the shake notification image generation unit 300 generates a shake notification image. The shake notification image is generated by superimposing a notification plane for giving a notification of a motion shake occurring in the subject (that a motion shake does not occur) in a case where an image is captured with imaging parameters in main imaging on a preparatory captured image. Details of the process of step S204 will be described later with reference to FIG. 4.

In step S205, the control unit 101 displays a shake notification image on the display device of the display unit 109 when the shake notification image is generated in step S204, and displays the preparatory captured image on which a motion shake notification plane is not superimposed on the display device when the setting of a motion shake notification is an OFF setting. In a case where the setting of a motion shake notification is an ON setting, the user can set imaging parameters such as a shutter speed (exposure time) of the main imaging while checking the displayed shake notification image.

In step S206, the control unit 101 determines whether or not a shutter button of the instruction input unit 110 has been pressed through a user operation. Here, the pressing of the shutter button is an imaging instruction for the main imaging. For this reason, in the case of a configuration in which a shutter button pressing input is received by a two-step input method such as half-pressing for giving an instruction for an imaging preparation operation and full-pressing for giving an instruction of main imaging, it is determined whether or not full-pressing has been performed. In a case where only a simple one-step input is received, it is determined whether or not the one-step input has been performed. In a case where the control unit 101 determines that the shutter button has not been pressed, the processing returns to step S202, and the processes of step S202 to step S206 are repeated. Thereby, the user can easily confirm a motion shake occurring in the subject in a case where the main imaging has been performed with the currently set imaging parameters while the preparatory imaging is in progress. If motion shake is confirmed and is not the user's preferred motion shake (a motion shake is not desired to occur), the user may set imaging parameters such as a shutter speed (exposure time) of the main imaging again without pressing the shutter button. On the other hand, in a case where the control unit 101 determines that the shutter button has been pressed, the control unit 101 causes the processing to proceed to step S207.

In step S207, the control unit 101 controls the optical system 104, the imaging unit 105, and the like such that the main imaging based on the set imaging parameters is performed and an image (main captured image) acquired. In step S208, the control unit 101 outputs the main captured image acquired by the main imaging to the display unit 109 and the recording unit 108. The display unit 109 displays the main captured image on the display device. In addition, the recording unit 108 records the main captured image on a recording medium or outputs the main captured image to an external device.

In this manner, in the imaging processing of the present embodiment, a user is notified of a motion shake of a subject by displaying a shake notification image during preparatory imaging. Thereby, the user can set an appropriate exposure time for the main imaging while confirming the shake notification image displayed on the display unit 109. In addition, a photo opportunity (main imaging) can be established in a state where an exposure time corresponding to an appropriate motion shake is set.

Figure 3:
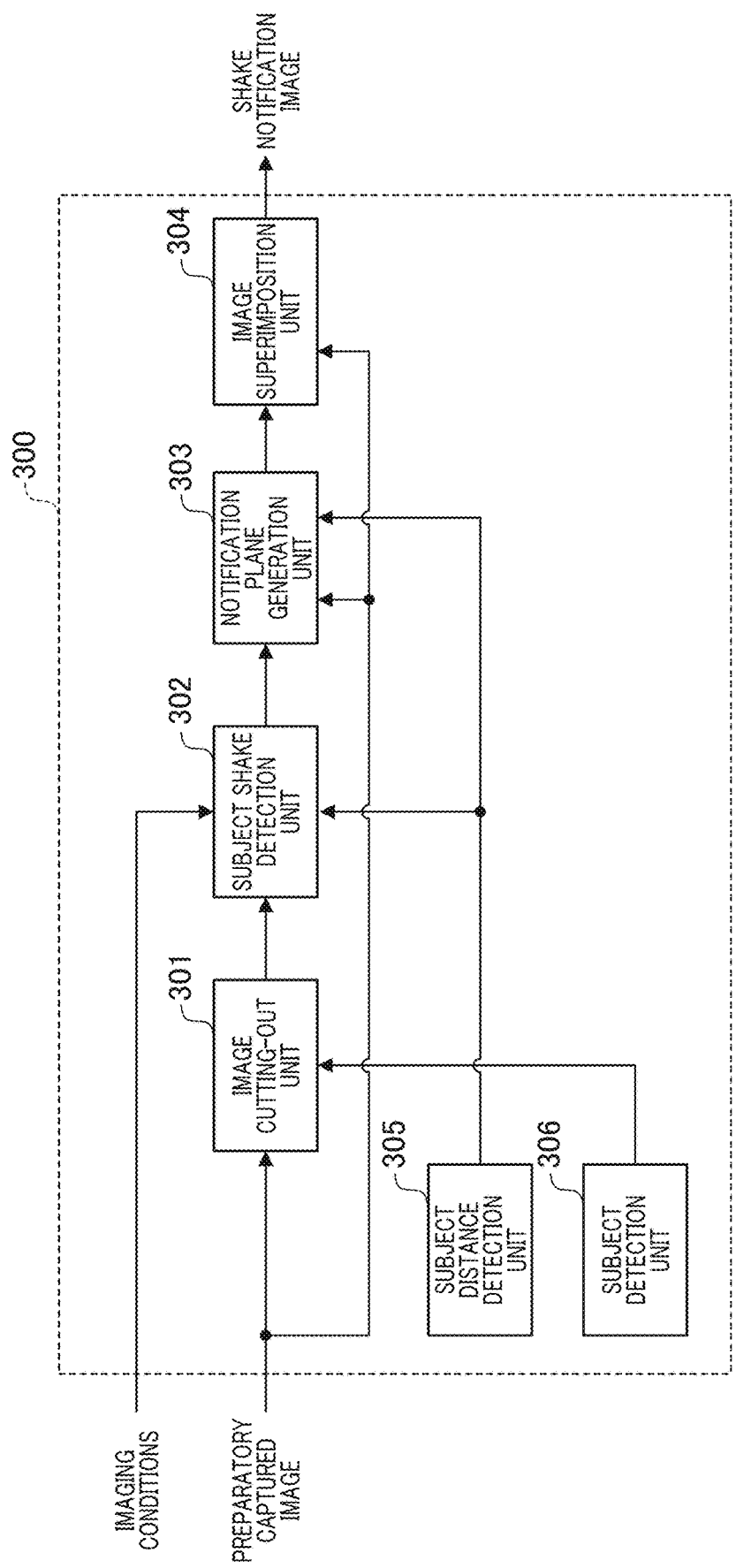
FIG. 3 is a diagram illustrating a configuration example of a shake notification image generation unit in a first embodiment.

Next, a configuration example of the shake notification image generation unit 300 included in the image processing unit 107 will be described with reference to FIG. 3. FIG. 3 is a diagram illustrating a configuration example of the shake notification image generation unit 300. The shake notification image generation unit 300 generates a shake notification image based on a preparatory imaging image and imaging conditions. The shake notification image generation unit 300 includes an image cutting-out unit 301, a subject shake detection unit 302, a notification plane generation unit 303, an image superimposition unit 304, a subject distance detection unit 305, and a subject detection unit 306.

The subject distance detection unit 305 detects a distance to a subject as subject distance data. The subject detection unit 306 detects the subject in an image. Further, the subject detection unit 306 can detect characteristic parts of the subject, such as the subject's type and organs. The image cutting-out unit 301 cuts out the subject detected by the subject detection unit 306 from the image. In the present embodiment, the image cutting-out unit 301 cuts out a preparatory captured image in units of characteristic parts of the subject detected by the subject detection unit 306. The subject shake detection unit 302 detects a subject shake of the subject detected by the subject detection unit 306. The notification plane generation unit 303 and the image superimposition unit 304 are notification image generation means for generating a shake notification image for giving a notification of a subject shake. First, the notification plane generation unit 303 generates a notification plane corresponding to the subject shake, and the image superimposition unit 304 superimposes the notification plane on the image to generate a shake notification image. The notification plane generation unit 303 generates a motion notification plane which is data for giving a notification of a subject shake based on the subject shake. Further, in the present embodiment, it is possible to give a notification of only a subject shake of a specific subject instead of all subjects. For this reason, the notification plane generation unit 303 of the present embodiment determines a specific subject to be notified of the subject shake based on distance information of the subject and generates a notification plane for giving a notification of the shake of the specific subject. The image superimposition unit 304 superimposes a motion shake notification plane on a captured image to generate a shake notification image.

Note that one or more of functional blocks illustrated in FIG. 3 may be realized by hardware such as an ASIC or a programmable logic array (PLA), or may be realized by a programmable processor such as a CPU or an MPU executing software. In addition, the one or more of functional blocks may be realized by a combination of software and hardware. Thus, even when different functional blocks are described as operation subjects in the following description, the same hardware may be realized as a subject.

Figure 4:
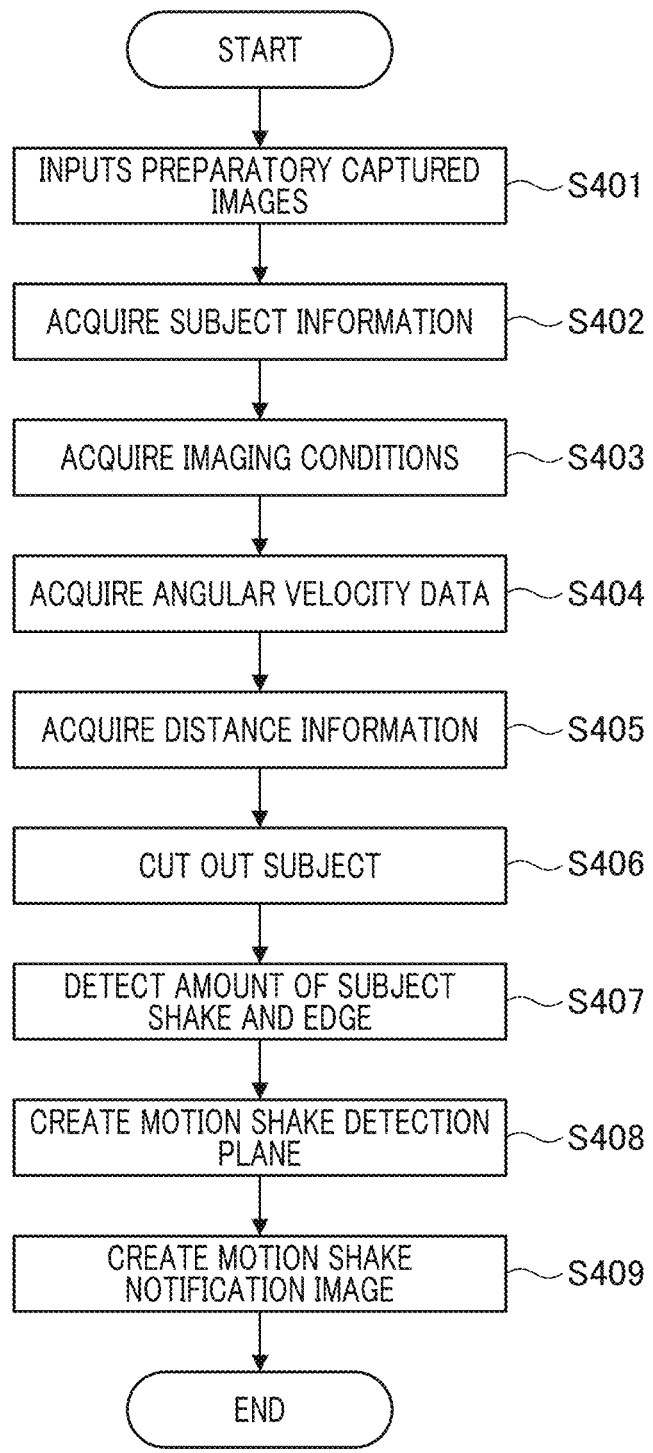
FIG. 4 is a diagram illustrating a processing flow of generation of a shake notification image in the first embodiment.

Next, processing for generating a shake notification image by the shake notification image generation unit 300, which is executed in step S204 of FIG. 2, will be described in detail with reference to a flowchart of FIG. 4. FIG. 4 is a flowchart illustrating processing for generating a shake notification image. Processes of steps in the present flowchart are realized by the control unit 101 giving an instruction to each unit of the imaging device 100 such as the shake notification image generation unit 300, in accordance with a predetermined program read from the ROM 102 and executed.

In step S401, the control unit 101 inputs preparatory imaging images sequentially captured by the imaging unit 105, the imaging parameters used in the main imaging determined in step S202, and the angular velocity data detected by the angular velocity detection unit 111 to the shake notification image generation unit 300. In step S402, the subject detection unit 306 of the shake notification image generation unit 300 detects a subject and acquires subject information. The subject detection unit 306 detects subject information by comparing data learned based on, for example, deep learning and a captured video. The subject information mentioned herein is the type and organs of the subject. Examples of the type of subject include a person, an animal (a dog, a cat, a bird, a horse, and the like), a vehicle (an automobile, a bicycle, a motorcycle, a formula car, and the like) and the like. In addition, in a case where the type of subject is a person, examples of subject's organs include the eyes, hands, feet, head, chest, and the like. Further, in a case where the type of subject is an animal, the subject's organs are the eyes, body, limbs, and the like. In a case where the subject is a vehicle, the subject's organs are a helmet, headlights, tail lamps, and the like. Note that the detection of the subject information based on machine learning is an example, and the subject information may be detected by other methods.

In step S403, the subject shake detection unit 302 acquires imaging conditions. Here, the imaging conditions acquired in step S403 are an exposure time (shutter speed) of the main imaging determined in step S202 acquired in step S401 and a time interval (frame rate) between images in preparatory imaging.

In step S404, the subject shake detection unit 302 acquires angular velocity data indicating a shake of the imaging device 100 from the angular velocity detection unit 111. The angular velocity detection unit 111 may be an inertial sensor such as a gyro sensor, or may calculate angular velocity data using vector values other than a subject region, a focal length, and a frame rate from a difference between different preparatory captured images by using a motion vector.

In step S405, the subject distance detection unit 305 acquires distance information (distance data) to the subject. The subject distance detection unit 305 detects distance information from a defocus value in units of each pixel by using, for example, an imaging element that has pixels for performing distance measurement of a phase difference system, the imaging element capable of performing distance measurement of an imaging surface phase difference system and focus detection on the imaging surface of the imaging unit 105. By using an imaging element capable of an imaging surface phase difference AF, the subject distance detection unit 305 can detect a defocus amount on the basis of a phase difference between output image signals of the imaging element which are obtained from different regions of an exit pupil of the optical system 104. In addition, the subject distance detection unit 305 may detect subject distance data by installing a sensor for measuring a distance, such as a laser displacement sensor, an ultrasonic sensor, or a millimeter wave radar, inside the imaging device 100. The subject distance detection unit 305 outputs the acquired distance information to the subject to the subject shake detection unit 302.

Figure 5:
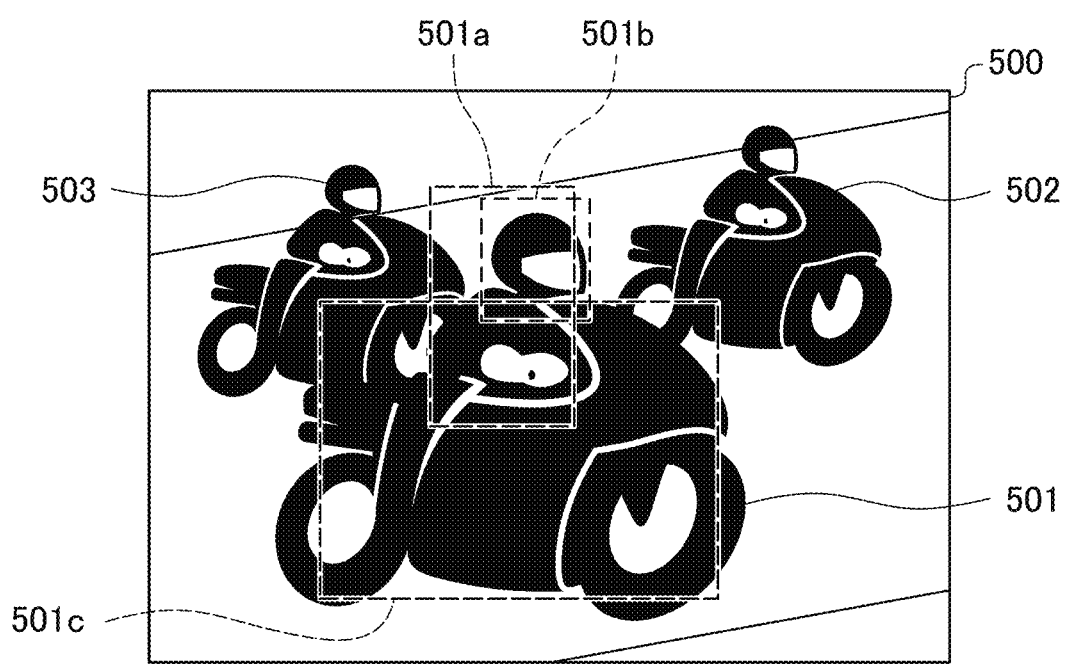
FIG. 5 is a diagram illustrating the cut-out of a subject.

In step S406, the image cutting-out unit 301 cuts out an image of the subject from a preparatory captured image based on the subject information detected by the subject detection unit 306 in step S402. The image cutting-out unit 301 detects, for example, a characteristic part of the subject within the same subject and cuts out an image for each part of the subject. Cutting-out of an image of a subject will be described with reference to FIG. 5. FIG. 5 is a diagram illustrating cutting-out of the subject. An example illustrated in FIG. 5 represents panning imaging in a motor sports scene as an example of an imaging scene, and a plurality of subjects (subjects 501, 502, and 503) are present in an imaging angle of view of a preparatory captured image 500. The subject detection unit 306 generates a cut-out image for each part (subject characteristic region) based on subject information such as the type of subject in each subject.

In a case where there are a plurality of subjects, a main subject may be determined from among the plurality of subjects. At this time, the image cutting-out unit 301 may automatically determine the main subject based on detection results of the subject detection unit 306, or a subject at a position arbitrarily selected by a photographer may be prioritized as the main subject. Further, the image cutting-out unit 301 may use the distance information to the subject detected by the subject distance detection unit 305 at the time of specifying the main subject. When the main subject is determined, the subject detection unit 306 detects a characteristic part of the subject in the main subject. For example, in a case where the subject 501 is the main subject, characteristic parts are a person 501a, a helmet 501b, and a motorcycle 501c. The image cutting-out unit 301 cuts out images in respective regions (subject characteristic regions) of the person 501a, the helmet 501b, and the motorcycle 501c. In addition, the purpose of cutting out the subject from the images here is to eliminate noise as much as possible and improve the detection accuracy of a subject shake at the time of detecting a subject shake, which will be described later. For example, in the panning imaging illustrated in FIG. 5, portrait imaging in which an aperture value is wide open to add bokeh to a background and make a person stand out, or the like, a shake and a bokeh become noticeable in a background part, and thus when the region is also input for subject shake detection, the detection accuracy of a subject shake is reduced. Further, in addition to creating a background image, in a case where a motion is different for each subject in a composition in which another subject overlaps the main subject, the detection accuracy of a subject shake is reduced similarly, and thus it is important to detect the main subject as accurately as possible.

Description will return to FIG. 4. In step S407, the subject shake detection unit 302 detects a subject shake from the cut-out image which is input from the image cutting-out unit 301. In the present embodiment, a subject shake (subject shake amount) is detected from the degree of bokeh (clearness) of the edge of the subject. This is because the edge becomes unclear like bokeh when a subject shake occurs, and the edge becomes clear without bokeh when a subject shake does not occur. Thus, it is determined that a subject shake is small when the edge is clear, and a subject shake is large when the edge is unclear. In the detection of the degree of clearness of the edge corresponding to a subject shake, for example, a Laplacian filter is used. In addition, it is possible to simultaneously detect a subject shake and a subject edge by using the Laplacian filter.

An example in which a subject shake is detected using a Laplacian filter will be described. The Laplacian filter is a spatial filter for extracting an edge from an image by using a secondary differential. Since an image to be input is digital data and discrete data, a differential can be calculated using a difference. Primary differentials Ix and Iy of pixel values in the horizontal and vertical directions of the Laplacian filter are as expressed by Equation (1).

$$\begin{cases} I_x(x, y) = 1(x+1, y) - I(x, y) \\ I_y(x, y) = I[(x, y+1) - I(x, y) \end{cases} \quad (1)$$

The Laplacian filter is a secondary differential. For this reason, the Laplacian filter can be expressed by Equation (2) by taking a difference between the primary differentials.

$$\begin{cases} I_{xx}(x, y) = I(x-1, y) - 2I(x, y) + I(x+1, y) \\ I_{yy}(x, y) = I[(x, y-1) - 2I(x, y) + I(x, y+1) \end{cases} \quad (2)$$

When the values of the horizontal direction and the vertical direction in Equation (2) are added, a Laplacian filter $\nabla^2 I(x, y)$ is obtained finally as shown in Equation (3). In the present embodiment, the detection of the edge of a subject and the calculation of a Laplacian value indicating the strength of a subject shake for each cut-out image are performed using a Laplacian filter. Although the calculation of the Laplacian value indicating the strength of a subject shake is performed for each cut-out image, the detection of the edge of the subject may be performed for each cut-out image or performed on the entire preparatory captured image.

$$\nabla^2 I(x,y) = I(x-1,y) + I(x,y-1) - 4I(x,y) + I(x+1,y) + I(x,y+1) \quad (3)$$

A kernel value indicating a strength (a value used for weighting) obtained by applying a filter from the Laplacian $\nabla^2 I(x, y)$ shown in Equation (3) is expressed by Equation (4) in the case of a kernel value of approximately 4. In addition, the kernel value is expressed by Equation (5) in the case of a kernel value of approximately 8.

$$K_4 = \begin{bmatrix} 0 & 1 & 0 \\ 1 & -4 & 1 \\ 0 & 1 & 0 \end{bmatrix} \quad (4)$$

$$K_8 = \begin{bmatrix} 1 & 1 & 1 \\ 1 & -8 & 1 \\ 1 & 1 & 1 \end{bmatrix} \quad (5)$$

The kernel value is the number of pixels around a pixel of interest. Equation (4) is a kernel value of approximately 4 and indicates that a secondary differential of four pixels on the upper, lower, right, and left sides of the pixel of interest is taken. Equation (5) is a kernel value of approximately 8 and indicates that a secondary differential of 8 pixels including not only the pixels on the upper, lower, right, and left sides of the pixel of interest but also pixels in oblique directions is taken. In the present embodiment, the kernel value is changed in accordance with the type of subject (subject information) of a cut-out image for each image cut out in a subject characteristic region. For example, a kernel value of approximately 4 is set for the helmet 501*b*, and a kernel value of approximately 8 is set for the motorcycle 501*c*. In addition, the number of surrounding pixels may be more than eight.

The clearer an edge, the greater a difference between pixel values (luminance values) of the pixel of interest and the surrounding pixels. In addition, when the difference between the pixel values (luminance values) of the pixel of interest and the surrounding pixels is large, a Laplacian value is also increased. For this reason, it is determined that the larger a Laplacian value, the clearer an edge and the smaller a subject shake, and the smaller a Laplacian value, the more unclear an edge and the greater a subject shake. In this manner, the subject shake detection unit 302 determines a Laplacian value for each cut-out image obtained with a set kernel value as the amount of subject shake. The Laplacian value for each cut-out image may be any value with which the degree of clearness of an edge can be determined, such as an average of absolute values of Laplacian values of pixels in the cut-out image. Note that, although an example in which a Laplacian filter is used has been described in the present embodiment, the present invention is not limited thereto, and any method of detecting a subject shake in accordance with the degree of clearness of an edge may be used.

Description will return to FIG. 4. In step S408, the notification plane generation unit 303 generates a notification plane for giving a notification of a motion shake of a subject in accordance with the subject shake detected in step S407. Here, an example in which a user is notified of a subject shake will be described. In the present embodiment, the amount of subject shake is notified of by performing peaking display for emphasizing the edge of a subject in an image displayed on a display device and varying the color of the peaking display in accordance with the amount of subject shake. For example, peaking display of a main subject is performed in red in a case where the subject shake is large enough to be visible on the image, and the peaking display of the main subject is performed in green in a case where the subject shake is so small enough to be invisible on the image. That is, the peaking display is performed in red in a case where a Laplacian value is small and the edge of the subject is unclear, and the peaking display is performed in green in a case where a Laplacian value is large and the edge of the subject is clear. Note that the number of colors for peaking display and the displayed colors are not limited thereto.

Figure 6:
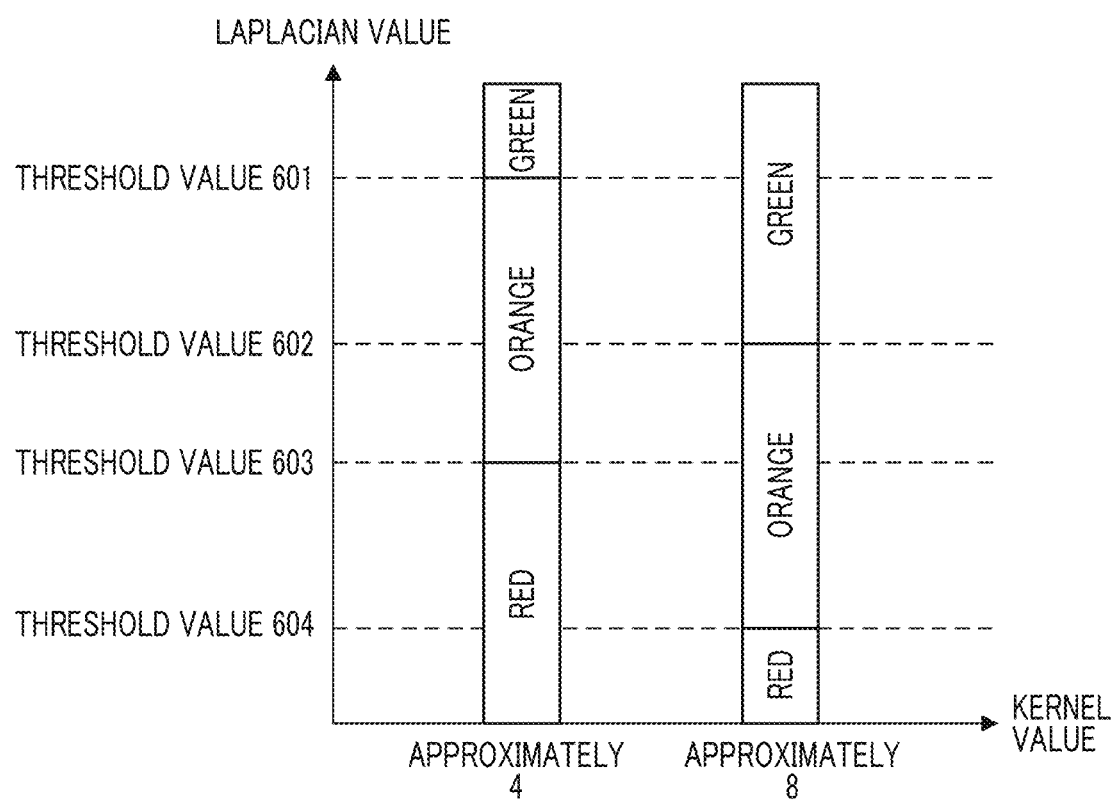
FIG. 6 is a diagram illustrating a change in a display color.

Here, changes in the color of display corresponding to the amount of subject shake will be described in more detail. FIG. 6 is a diagram illustrating changes in the color of display. In FIG. 6, the vertical axis indicates a Laplacian value of a cut-out image, and the horizontal axis indicates a kernel value. FIG. 6 illustrates Laplacian values obtained by applying a Laplacian filter with a kernel of approximately 4 and a kernel of approximately 8 to an image cut out in the helmet 501*b* of the subject 501 in FIG. 5. In this manner, a color to be displayed for the edge of the subject to give a notification of a subject shake in accordance with the Laplacian value corresponding to the amount of subject shake is changed. Even when the same image is used, the Laplacian value varies depending on the kernel value. For this reason, a threshold value for determining a color at the time of visualizing the amount of subject shake is changed in accordance with a kernel value.

For example, in a case where a Laplacian filter is applied with a kernel value of approximately 4 with respect to the size of an image cut out in the helmet 501b, the color of peaking display is set to green when the Laplacian value is equal to or greater than a threshold value 601, is set to orange when the Laplacian value is less than the threshold value 601 and equal to or greater than a threshold value 603, and is set to red when the Laplacian value is less than the threshold value 603. Further, in a case where a Laplacian filter is applied with a kernel value of approximately 8, the color of peaking display is set to green when the Laplacian value is equal to or greater than a threshold value 602, is set to orange when the Laplacian value is less than the threshold value 602 and equal to or greater than a threshold value 604, and is set to red when the Laplacian value is less than the threshold value 604. In this manner, a threshold value for determining a color to be displayed is changed in accordance with a kernel value. In addition to the kernel value, a threshold value for determining a color to be displayed may also be changed in accordance with a subject region or an image size for the cut-out of the image cutting-out unit 301. In addition, although two types of kernel values have been described in FIG. 6, but the number may be increased to kernel values of approximately 16 or so. Note that a method for giving a notification of a subject shake is not limited to changes in the color of peeing display. For example, the line thickness of the edge of the peaking display may be changed, the line may be blinked, or the line may be configured as a dashed line. Further, display for giving a notification of a subject shake may be performed only when the amount of subject shake is equal to or greater than a predetermined threshold value.

Figure 7A:
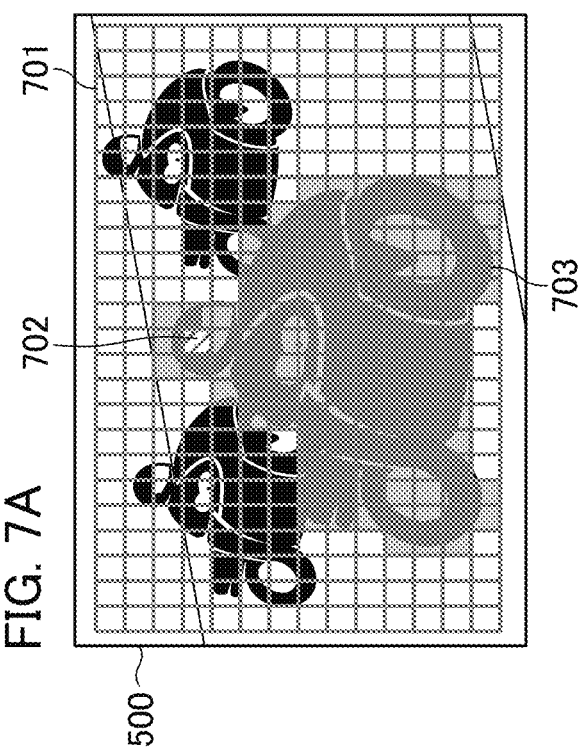
FIGS. 7A to 7C illustrate processing of a notification plane generation unit.
Figure 7B:
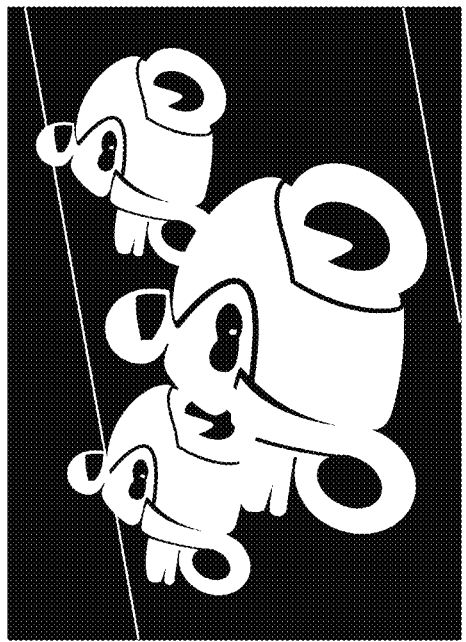
Figure 7C:
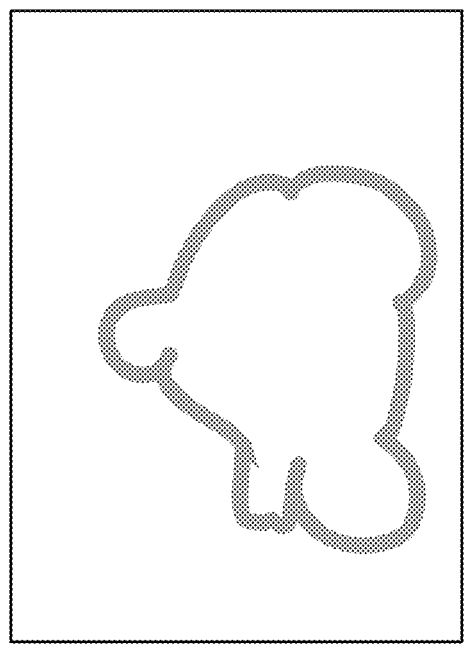

Next, the generation of a notification plane for giving a notification of a subject shake and the generation of a shake notification image obtained by superimposing the generated notification plane on an image will be described in detail with reference to FIGS. 7A to 7C. FIGS. 7A to 7C are diagrams illustrating the processing of the notification plane generation unit 303. FIG. 7A is a diagram illustrating the arrangement of distance detection frames 701. The distance detection frames 701 are detection frames for detecting a subject distance by the subject distance detection unit 305, are disposed over substantially the entire preparatory captured image 500, and have a plurality of detection frames (in the example of FIG. 7A, 14 vertical×24 horizontal). A main focus distance detection frame 703 corresponding to a subject distance within a predetermined threshold value range is shown as a semi-transparent frame with reference to a subject distance in a main focus frame 702, which is the most focused among the distance detection frames 701. For example, the notification plane generation unit 303 specifies a subject in the depth of field within the range of a threshold value (for example, ±2 depths) with reference to the depth of field of the main focus frame 702, on the basis of distance information calculated by the subject distance detection unit 305. Note that, although an example in which a specific subject to be subjected to peaking display is determined on the basis of distance information using an in-focus region as a base region has been described in the present embodiment, the present invention is not limited thereto, and for example, a region on which an AF frame (main distance measurement frame) is superimposed may be set as a specific base region of a subject based on distance information.

FIG. 7B is a diagram illustrating an image to which the Laplacian filter of the subject shake detection unit 302 is applied. The Laplacian filter is applied to the preparatory captured image 500 to detect the edge of a subject. FIG. 7C is a diagram illustrating a notification plane. The notification plane is an image in which peaking display such as color display corresponding to a subject shake is performed on the edge of the subject in the main focus distance detection frame 703 that is most focused. Specifically, the notification plane generation unit 303 superimposes the main focus distance detection frame 703 (FIG. 7A) detected based on the depth of field and the image of the edge of the subject detected by the Laplacian filter (FIG. 7B) on each other and performs peaking display on the edge of the superimposed portion. The color of the peaking display is determined in accordance with a Laplacian value calculated for each cut-out image, and when the cut-out ranges overlap each other, a color corresponding to a larger shake is prioritized. For example, in a case where the motorcycle 501c is green, the person 501a is orange, and the helmet 501b is red, an edge within the region of the helmet 501b will be red.

Description will return to FIG. 4. In step S409, the image superimposition unit 304 superimposes the notification plane generated in step S406 on the preparatory captured image (FIG. 7C) to generate a shake notification image. For example, the image superimposition unit 304 superimposes the preparatory captured image and the notification plane on the RAM 103 to generate a shake notification image. By superimposing the preparatory captured image and the notification plane on each other, peaking display of a main subject on the preparatory captured image can be performed in accordance with a subject shake.

Figure 8A:
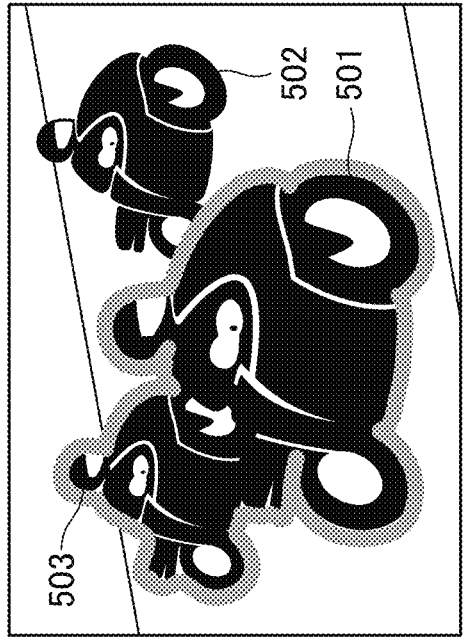
FIGS. 8A to 8D are diagrams illustrating an example of a shake notification image.
Figure 8C:
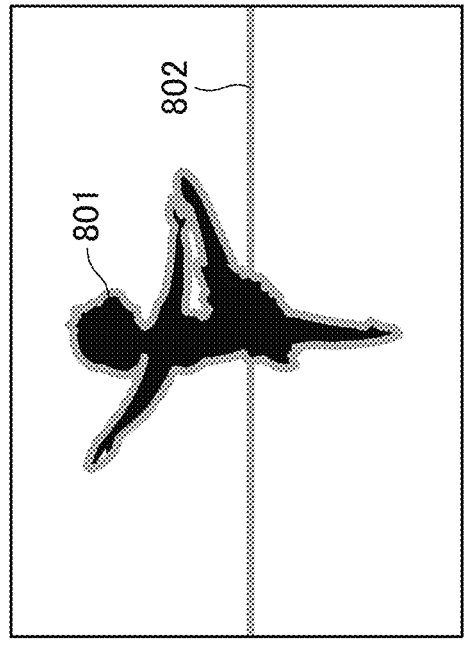
Figure 8B:
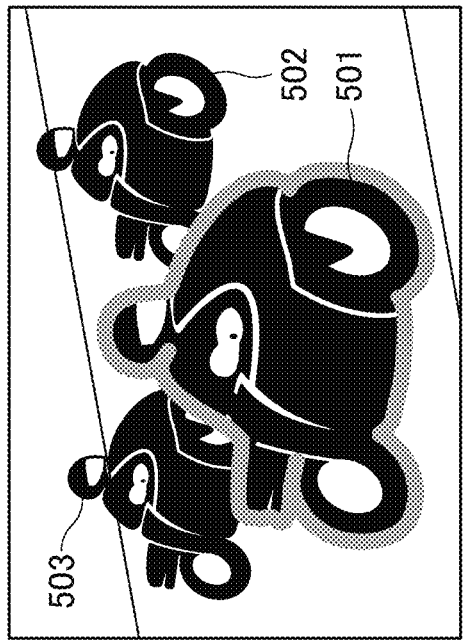
Figure 8D:
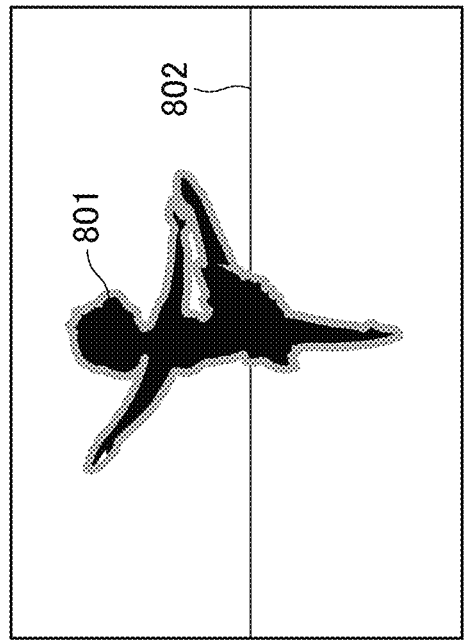

FIGS. 8A to 8D are diagrams illustrating an example of a shake notification image. A motor sports (motorcycle) is a subject in FIGS. 8A and 8B, and a ballerina is a subject in FIGS. 8C and 8D. Examples to which the present embodiment is applied are illustrated in FIGS. 8A and 8C. In FIG. 8B, the subject 501 and the subject 503 are detected as the same subject, and regions other than the subject 501, which is the main subject, are also notified of. On the other hand, according to the present embodiment, it is possible to perform peaking display for only a specific subject within a predetermined distance from a subject distance in an in-focus region for which a photographer attempts to perform imaging. For this reason, according to the present embodiment, as illustrated in FIG. 8A, it is possible to generate an image in which peaking display is performed for only the edge of an intended specific subject (subject 501) and to notify a photographer of only a subject shake of the subject 501. In addition, even when there is only one subject, there is a concern that a boundary line 802 between a stage and a back wall will be detected as a portion of the subject, and peaking display will be performed as illustrated in FIG. 8D. On the other hand, according to the present embodiment, as illustrated in FIG. 8C, it is possible to perform peaking display for only a subject 801 and notify a photographer of only a subject shake of the subject 801.

Note that, although an example of live-view imaging in which an image is displayed in real time on a display device provided on a photographer side of the imaging device 100 has been described in the present embodiment, the present invention is not limited thereto, and an image for giving a notification of a subject shake may be displayed on another display device such as an EVF. Further, in the first embodiment, processing for acquiring angular velocity data (step S404) may not be performed.

As described above, according to the present embodiment, it is possible to generate an image in which a subject shake of a main subject for which a photographer attempts to perform imaging can be easily confirmed. By the photographer confirming this image, the photographer can easily set a shutter speed at which a subject shake does not occur, and can obtain a high-quality image in which a subject shake is suppressed in the main imaging.

Second Embodiment

In the present embodiment, a subject shake detection method different from that in the first embodiment is used to detect a subject shake and generate a shake notification image. In the first embodiment, a subject shake is detected using a Laplacian filter for an image obtained by cutting out a subject. On the other hand, in the present embodiment, a main subject is specified based on a motion vector calculated from a plurality of images, and a subject shake is detected. In the following, a detection method of a subject shake detection unit 302, which is different from that in the first embodiment, will be described, and description of other common operations and processing will be omitted.

Figure 9:
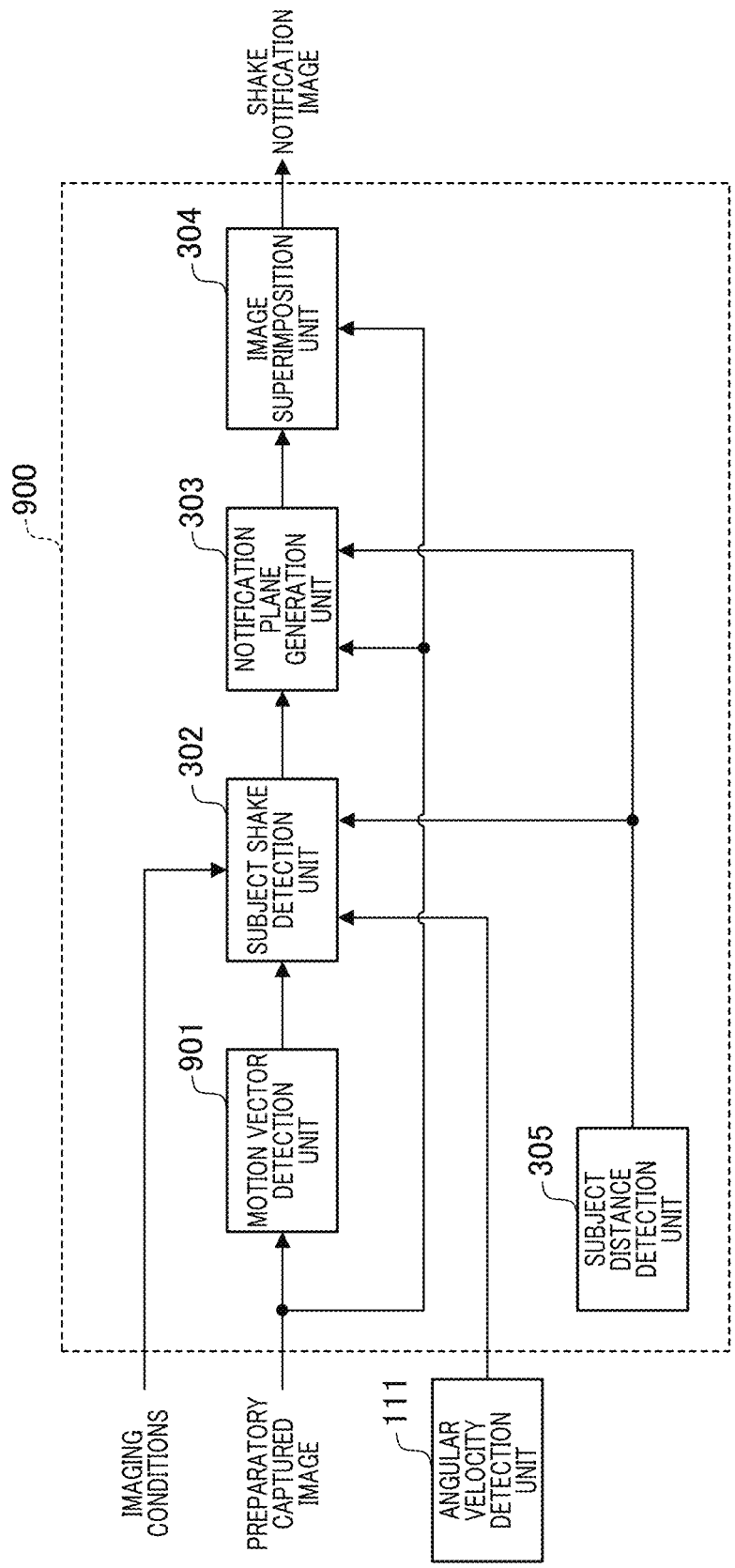
FIG. 9 is a diagram illustrating a configuration example of a shake notification image generation unit in a second embodiment.

An image processing unit 107 in the second embodiment includes a shake notification image generation unit 900 instead of the shake notification image generation unit 300 in the first embodiment. FIG. 9 is a diagram illustrating a configuration of the shake notification image generation unit 900 in the second embodiment. The shake notification image generation unit 900 includes a motion vector detection unit 901, a subject shake detection unit 902, a notification plane generation unit 303, an image superimposition unit 304, and a subject distance detection unit 305. Operations and processing of units other than the motion vector detection unit 901, the subject shake detection unit 902, and the angular velocity detection unit 111 are the same as those in the first embodiment, and description thereof will be omitted.

The motion vector detection unit 901 detects a motion vector based on a plurality of preparatory captured images. Specifically, the motion vector detection unit 901 uses the plurality of preparatory captured images as a base frame and a reference frame, respectively, and performs correlation calculation with each block in a target region in the reference frame by using a base block in the base frame. As a result of the correlation calculation, a motion vector is calculated from a positional relationship between a block with the highest correlation and the reference block. A method of calculating a correlation value is not particularly limited, such as a method based on a difference absolute value sum, a difference square sum, or a normal cross-correlation value. Further, the motion vector calculation method itself is not limited to the correlation calculation, and other methods such as a gradient method may be used. The motion vector detection unit 901 outputs data of the detected motion vector (vector data) to the subject shake detection unit 902.

The subject shake detection unit 902 calculates a subject vector based on a motion vector and detects a subject shake. The subject shake detection unit 902 separates the vector data into vector data related to the subject and vector data not related to the subject based on vector data of an image, angular velocity data of the imaging device 100, and subject distance data. The vector data not related to the subject is, for example, vector data of a background. In addition, the subject shake detection unit 902 detects a subject shake based on the vector data related to the subject. The vector data (motion vector) of the image is input from the motion vector detection unit 901 to the subject shake detection unit 902, the angular velocity data is input from the angular velocity detection unit 111 to the subject shake detection unit 902, and the subject distance data is input from the subject distance detection unit 305 to the subject shake detection unit 902. Here, a method of separating the vector data will be described in detail with reference to FIGS. 10A and 10B.

Figure 10B:
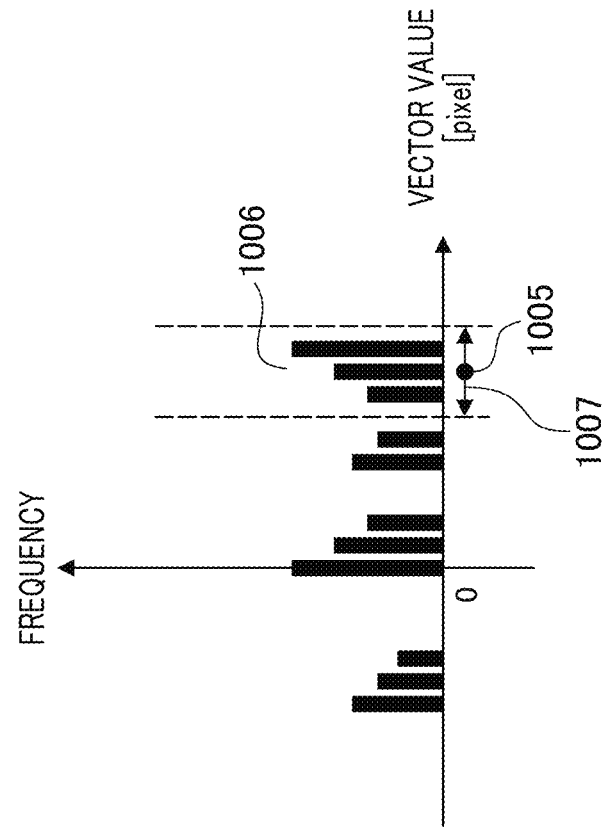
FIGS. 10A and 10B are diagrams illustrating processing of a subject shake detection unit in the second embodiment.
Figure 10A:
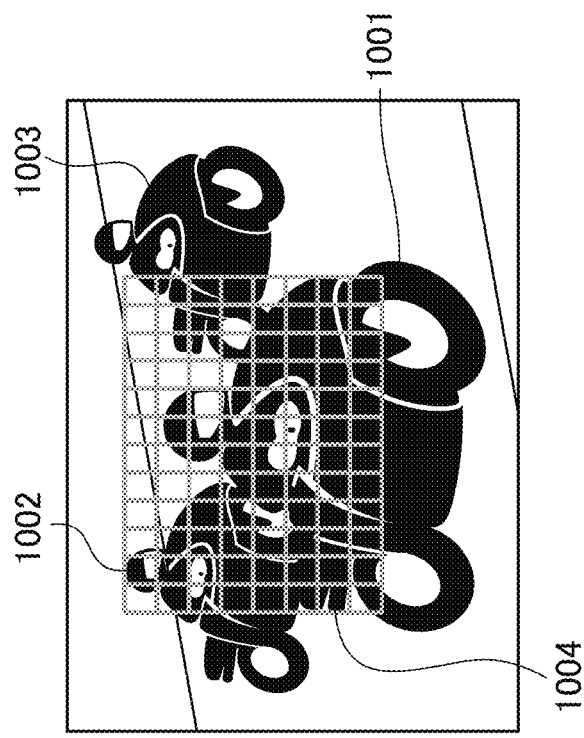

FIGS. 10A and 10B are diagrams illustrating a method of separating vector data. FIG. 10A is a diagram illustrating detection of a motion vector. FIG. 10B illustrates a frequency distribution of vector values. FIG. 10A illustrates a panning scene of motor sports as an example of imaging, and a plurality of subjects (subjects 1001, 1002, and 1003) are present in an imaging angle of view. A motion vector detection frame 1004 is disposed in an image, and for example, the amount of motion with respect to a frame before one frame is detected as a vector value in each block within the motion vector detection frame 1004. In FIG. 10B illustrating a frequency distribution, the horizontal axis indicates a vector value detected by the motion vector detection frame 1004, and the vertical axis indicates a frequency. Note that it is desirable that the motion vector detection frame 1004 covers the entire imaging angle of view when the entire motion of a screen is desired to be detected, but it is desirable that detection frames are densely disposed in a small size when the motion of a portion (subject) of an imaging angle of view is desired to be detected as in the present embodiment. This is because the larger the motion vector detection frame 1004 is, the larger the computational processing becomes in a case where an imaging element has a large number of pixels or in a case where a frame rate cycle is fast such as a case where the motion vector detection frame 1004 covers the entire imaging angle of view. When the computational processing for motion vector detection becomes larger, there is a concern that a delay will occur in the generation and display of a moving body shake notification image. In addition, when the computational processing for motion vector detection becomes larger, power consumption will increase, and the maximum number of images that can be captured will also decrease. Regarding the motion vector detection frame 1004 that does not cover the entire angle of view, for example, the motion vector detection frame 1004 may be disposed along an AF frame. This is because the AF frame is likely to be on the subject, and disposing the motion vector detection frame 1004 along the AF frame increases a possibility that the motion vector detection frame 1004 captures the subject.

In FIG. 10B, the angular velocity data 1005 is a value obtained by converting the angular velocity data of the imaging device 100 detected by the angular velocity detection unit 111 into the amount of motion on an imaging surface. The subject detection unit 306 converts the angular velocity data into the amount of motion on the imaging surface using Equation (6).

$$\sigma = f \tan(\omega/p)/a \qquad 6$$

Here, δ is the amount of motion on the imaging surface [mm], f is a focal length [mm], ω is an angular velocity [deg/sec], p is a frame rate [fps], and a is a pixel pitch [mm/pixel].

In a case where imaging is performed while moving (while panning) a camera greatly as illustrated in FIG. 10A, a value obtained by converting the angular velocity data of the imaging device 100 into the amount of motion on the imaging surface and a vector related to a background of an image match on the imaging surface. That is, a vector 1006 existing near the angular velocity data 1005 converted in units of pixels on the imaging surface corresponds to a background in the motion vector detection frame 1004. Actually, the angular velocity detection unit 111 undergoes an offset drift in which a reference value fluctuates due to disturbances such as temperature changes and impacts. For this reason, the subject shake detection unit 902 provides a predetermined range 1007 in consideration of an offset drift based on the angular velocity data 1005 converted into pixel units on the imaging surface, and determines vectors within the predetermined range 1007 as background vectors. Note that the range of the predetermined range 1007 with the angular velocity data 1005 as a base point may be changed while observing a focal length and the amount of offset change.

In addition, the subject shake detection unit 902 sets vectors outside the predetermined range 1007 as subject candidates, and determines a vector closest to a predetermined condition among the vectors of the subject candidates to be a vector of a main subject. For example, the subject shake detection unit 902 determines that a vector at the position of the highest frequency, which is close to approximately 0, among the vectors of the subject candidates to be the vector of the main subject. In addition, the subject shake detection unit 902 may preferentially determine a vector frame at the position which is determined as the main subject by the subject detection unit 306 among the vectors of the subject candidates to be the vector of the main subject.

In addition, the subject shake detection unit 902 may determine a vector frame to be adopted according to subject detection results by using, for example, a subject detection function having a deep learning function without using a frequency distribution. For example, in FIG. 10A, in a case where a subject 1001 is detected as a main subject by the subject detection function and the position of a head can be detected, a vector closest to the position of the head may be adopted.

Further, as described in the first embodiment, subject distance data detected by the subject distance detection unit 305 may be used for the detection of a subject vector. For example, in a case where there is a main focus frame (AF frame) on the head of the subject 1001, a vector frame corresponding to a frame within a predetermined range (for example, ±2 depths) based on the depth of field of the main focus frame is determined to be a subject, and the vector value of the vector frame is adopted as a subject vector. In addition, subject vectors extracted from the angular velocity data and the subject distance data may be superimposed, and an overlapping region under both conditions may be finally determined to be a subject vector.

The subject shake detection unit 902 outputs the detected subject shake to the notification plane generation unit 303. The notification plane generation unit 303 generates a notification plane corresponding to the subject shake detected by the subject shake detection unit 902. In a case where the notification plane is peaking display for the edge of the subject, the notification plane generation unit 303 detects the edge of the subject in the same manner as in the first embodiment. Further, the notification plane generation unit 303 may specify a region for giving a notification of the subject shake based on distance information of the subject in the same manner as in the first embodiment. In addition, similarly to in the first embodiment, the image superimposition unit 304 superimposes the notification plane on a preparatory captured image to generate a shake notification image in which an edge is emphasized in accordance with a subject shake. The generated shake notification image is displayed on a display device, and a user can set a shutter speed and the like while confirming the shake notification image.

As described above, according to the present embodiment, it is possible to generate an image in which a subject shake of a main subject for which a photographer attempts to perform imaging can be easily confirmed. By the photographer confirming this image, the photographer can easily set a shutter speed at which a subject shake does not occur and can acquire a high-quality image in which a subject shake is suppressed in the main imaging.

Other Embodiments

In the first and second embodiments described above, the magnitude of a shake is determined based on a Laplacian value, but the magnitude of a shake may be determined in consideration of the influence of a decrease in a Laplacian value due to bokeh in order to more accurately determine the magnitude of a shake. In a case where bokeh is large in spite of a small shake, a Laplacian value decreases. Accordingly, in a case where a Laplacian value is small, frequencies of a shake and bokeh included in a cut-out image may be analyzed to separate the shake and the bokeh from each other and generate a notification plane based on the amount of shake from which the influence of the bokeh has been separated. The analysis of the frequencies can be performed, for example, by applying a point spread function to the cut-out image. A shake has a specific frequency, whereas bokeh is a composite result of various frequencies. Thus, it can be considered that the influence of a shake is large in a case where a thin peak appears at a specific frequency in a frequency space, and the influence of bokeh is large in a case where a wide peak appears or a specific peak does not appear. For example, as described in FIG. 6 and step S407, a Laplacian value for displaying the edge in red is calculated from a relationship with a threshold value, and the edge is displayed in red in a case where it is determined that the influence of a shake is large through frequency analysis. On the other hand, in a case where it is determined that the influence of bokeh is large as a result of frequency analysis even when the same Laplacian value is calculated, it is considered that a Laplacian value has decreased due to the influence of bokeh, a shake is determined to be small, and the edge is displayed in green.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-197176, filed Dec. 3, 2021, which is hereby incorporated by reference wherein in its entirety.

What is claimed is:

1. An image processing device comprising:
one or more processors configured to execute instructions which, when executed by the one or more processors, cause the image processing unit to:
detect a subject of an image;
detect distance information that indicates a distance to the subject;
detect a subject shake; and
generate a shake notification image for giving a notification of a change in the detected amount of the subject shake of a specific subject based on the detected subject shake and the distance information,
wherein, in the shake notification image, a change of color indicates the detected change in the amount of subject shake.

2. The image processing device according to claim 1, wherein the processor determines a specific subject for giving a notification of a subject shake based on the distance information.

3. The image processing device according to claim 1, wherein the specific subject is a subject at a subject distance within a predetermined range from a subject distance in a base region, or a subject at a depth of field within a predetermined range from a depth of field corresponding to the subject distance of the base region.

4. The image processing device according to claim 3, wherein the base region is a region corresponding to a main distance measurement frame or an in-focus region.

5. The image processing device according to claim 1, wherein the processor further executes an instruction to cause the image processing device to cut out an image for each characteristic region of the subject based on subject information, and
the processor detects a subject shake for each cut-out image and change the color indicating the subject shake in accordance with the amount of subject shake.

6. The image processing device according to claim 5, wherein the processor detects a subject shake based on the degree of clearness of an edge of the subject.

7. The image processing device according to claim 5, wherein the processor simultaneously detects both an edge of the subject and a subject shake using a Laplacian filter, and
in the shake notification image, the color indicating the subject shake in accordance with a Laplacian value calculated using the Laplacian filter.

8. The image processing device according to claim 7, wherein the processor changes a threshold value for changing the color indicating the subject shake in the shake notification image by changing a kernel value of the Laplacian filter in accordance with the subject information for each cut-out image.

9. The image processing device according to claim 1, wherein the processor detects a subject shake based on motion vectors detected from a plurality of images.

10. The image processing device according to claim 1, wherein the processor detects distance information based on distance measurement of a phase difference system.

11. The image processing device according to claim 1, wherein the computer processor executes computer instructions that cause the device to cut out an image for each characteristic region of the subject based on subject information, including information identifying type of a subject and subject's component parts, determine shaking for each cut out subject and provide shake notification for each cut out subject.

12. An imaging device comprising:
an imaging element configured to include pixels for performing distance measurement of a phase difference system; and
one or more processors configured to execute instructions which, when executed by the one or more processors, cause the image processing element to:
detect a subject of an image,
detect distance information that indicates a distance to the subject,
detect a subject shake,
generate a shake notification image for giving a notification of a change in the detected amount of the subject shake of a specific subject based on the detected subject shake and the distance information, and
display the shake notification image,
wherein, in the shake notification image, a change of color indicates the detected change in the amount of subject shake.

13. The imaging device according to claim 12, wherein the computer processor executes computer instructions that cause the device to cut out an image for each characteristic region of the subject based on subject information, including information identifying type of a subject and subject's component parts, determine shaking for each cut out subject and provide shake notification for each cut out subject.

14. A control method for an image processing device, the method comprising:
detecting a subject of an image;
detecting distance information that indicates a distance to the subject;
detecting a subject shake; and
generating a shake notification image for giving a notification of a change in the detected amount of the subject shake of a specific subject based on the detected subject shake and the distance information, and
displaying the shake notification image,
wherein, in the shake notification image, a change of color indicates the detected change in the amount of subject shake.

15. The method according to claim 14 comprising:
cutting out an image for each characteristic region of the subject based on subject information, including information identifying type of a subject and subject's component parts, determining shaking for each cut out subject and providing shake notification for each cut out subject.

16. A non-transitory storage medium storing a control program of an image processing device causing a computer to perform each step of a control method for the image processing device, the method comprising:
- detecting a subject of an image;
- detecting distance information that indicates a distance to the subject;
- detecting a subject shake; and
- generating a shake notification image for giving a notification of a change in the detected amount of the subject shake of a specific subject based on the detected subject shake and the distance information, and
- displaying the shake notification image,
- wherein, in the shake notification image, a change of color indicates the detected change in the amount of subject shake.

17. The storage medium of claim 16, wherein the stored control program causes the image processing device to cut out an image for each characteristic region of the subject based on subject information, including information identifying type of a subject and subject's component parts, determine shaking for each cut out subject and provide shake notification for each cut out subject.

18. An image processing device comprising:
- one or more processors configured to execute instructions which, when executed by the one or more processors, cause the image processing unit to:
- detect a subject of an image;
- detect distance information that indicates a distance to the subject;
- detect a subject shake; and
- generate a shake notification image for giving a notification of a change in the detected amount of the subject shake of a specific subject based on the detected subject shake and the distance information,
- simultaneously detect both an edge of the subject and a subject shake using a Laplacian filter;
- change a threshold value for changing the color indicates the subject shake in the shake notification image by changing a kernel value of the Laplacian filter in accordance with the subject information for each cut-out image;
- cut out an image for each characteristic region of the subject based on subject information, and detect a subject shake for each cut-out image and change the color indicating the subject shake in accordance with the amount of subject,
- wherein, in the shake notification image, a change of color indicates the detected change in the amount of subject shake, and the color indicates the subject shake in accordance with a Laplacian value calculated using the Laplacian filter.

19. The image processing device of claim 18, wherein the processor further executes an instruction to cause the image processing device to cut out an image for each characteristic region of the subject based on subject information, including information identifying type of a subject and subject's component parts, determine shaking for each cut out subject and provide shake notification for each cut out subject.

* * * * *